United States Patent [19]
Zimmerman, deceased et al.

[11] Patent Number: 5,356,534
[45] Date of Patent: Oct. 18, 1994

[54] MAGNETIC-FIELD AMPLIFIER

[76] Inventors: George M. Zimmerman, deceased, late of 513 N. Dobbins Dr., San Gabriel, Calif. 91775, by Patricia W. Zimmerman, legal representative

[21] Appl. No.: 582,929
[22] PCT Filed: Mar. 7, 1989
[86] PCT No.: PCT/US89/00891
  § 371 Date: Jul. 24, 1992
  § 102(e) Date: Jul. 24, 1992
[87] PCT Pub. No.: WO90/10598
  PCT Pub. Date: Sep. 20, 1990
[51] Int. Cl.$^5$ .............................................. C02F 1/48
[52] U.S. Cl. ................................. 210/222; 335/304; 335/306; 123/538
[58] Field of Search ............... 210/222; 335/304, 306; 123/538

[56] References Cited

U.S. PATENT DOCUMENTS

| | | | |
|---|---|---|---|
| 2,652,925 | 9/1953 | Vermeiren | 210/222 |
| 3,349,354 | 10/1967 | Miyata | 335/209 |
| 3,480,145 | 11/1969 | Gladden | 210/223 |
| 4,210,535 | 7/1980 | Risk | 210/222 |
| 4,265,746 | 5/1981 | Zimmerman, Sr. et al. | 210/222 |
| 4,265,754 | 5/1981 | Menold | 210/222 |
| 4,265,755 | 5/1981 | Zimmerman | 210/222 |

Primary Examiner—Matthew O. Savage
Attorney, Agent, or Firm—Albert O. Cota

[57] ABSTRACT

An improved magnetic-field amplifier (10) consisting of a magnetic amplifying assembly (12) that generates a pair of magnetic loops (A), (B) that are summed at two ferromagnetic pole members (20), (22) to produce a composite magnetic field. The magnetic amplifying assembly (12) is disclosed in two configurations: an externally mounted unit and an annular, in-line mounted unit. Either the externally or annular in-line mounted units may be attached to a fluid conduit (60) to remove contaminants from the fluid. A form of the externally mounted unit may also be attached circumferentially to a motor or generator housing from where the composite magnetic field is used to operate the armature (33). The magnetic amplifying assembly is also adaptable to other magnetically operated devices that can benefit from an increased magnetic field.

5 Claims, 4 Drawing Sheets

■ = MAGNETIC PATH NO.1
▲ = MAGNETIC PATH NO.2

MAGNETIC-FIELD AMPLIFIER

TECHNICAL FIELD

The invention pertains to the general field of magnetic devices and more particularly to an improved magnetic-field amplifier that generates a pair of magnetic loops that are summed to produce a composite magnetic field that may be used to treat fluids and magnetically operated assemblies.

BACKGROUND ART

Since the industrial utility of magnetism became evident, there has been constant research to improve or increase the magnetic force/field produced by permanent magnets. The improvements have primarily involved the magnetic material rather than developing an amplifying structure that increases the magnetic flux density.

In addition to the use of permanent magnets in research and various magnetically operated devices, they have also been used for treating fluids, and in particular water flowing in fluid conduits.

Water in a natural stream carries a positive static charge which causes the suspended solids to tend to precipitate and the dissolved solids to tend to remain in solution, in an ortho-rhombic precrystalline state. Water flowing, in a conduit, however, loses its positive charge. This condition causes most suspended solids to tend to remain in solution, and most dissolved solids to change to a rhombic precrystalline state. In the case of calcium carbonate, which is the most predominent dissolved mineral in "hard" water, the change is from aragonite (a fragile, orthorhombic crystal) to calcite (the familiar, rhombic, hard scale crystal present in pipes).

Currently, water treatment and conditioning are primarily provided by the chemical removal of minerals. This method has caused wide-spread pipe and water equipment damage and extensive pollution. Additionally, these methods are also material and labor-intensive, requiring constant supply, system maintenance, equipment repairs and effluent treatment.

The current magnetic water treatment devices are classified into external and internal devices. The internal devices are located within the conduit in the path of the water flow. These units do prevent some conduit scaling. However, they suffer from head loss, fouling caused by obstructions, collect iron particles on the magnetic elements and promote corrosion of the conduit; requiring chemical corrosion inhibitors which pollute the effluent. The internal units also require periodic cleaning, are harder to install and monitor than the external units and are generally, more expensive.

The external devices are further classified into passive devices requiring no outside power or devices that use electro-magnets which do require power. The electro-magnet devices are more expensive, they deteriorate with time, they have power supply problems, require maintenance and they are subject to the dangers of shock, fire and electrolysis. The instant invention falls into the category of a passive device.

A search of the prior art did not disclose any patents that read directly on the claims of the instant invention however, the following U.S. patents were considered related:

| PATENT NO. | INVENTOR | ISSUED | |
|---|---|---|---|
| 4,265,754 | Menold | 5 May | 1981 |
| 4,265,746 | Zimmerman et al | 5 May | 1981 |
| 3,567,026 | Kolm | 2 March | 1971 |
| 3,608,718 | Aubrey, et al | 28 September | 1971 |

The Menold and Zimmerman patents, of which Zimmerman is the inventor of the instant invention, both cover a system that uses an external magnetic amplifying assembly which maintains a negative static charge on an electrically conducive water conduit. This assembly differs from the design of the instant invention in that the prior art assembly requires a relatively thin, metallic strip 32 that passes over the top of the structure 18 and over the side surfaces 22 where it is fixed in place. The segment of the strip 32 that passes over the top of the structure 18 is spaced therefrom to avoid magnetically short-circuiting the field of the pole members 24. An insulative member 34 fills that space to prevent a magnetic short circuit. This insulative strip was found to be not cost-effective and not required. Additionally, the two piece interfitting housing 38 was found to be not conducive to manufacturing, difficult to assemble and more importantly, due to its smooth surface, was difficult to securely attach the housing to the fluid conduit. This attachment problem, in many cases, also causes an electrical resistance to occur at the interface of the pole pieces and conduit. This resistance inhibits electrons from flowing from the outside to the inside of the fluid conduit, which is what causes the conduit to change from a positive charge to a negative charge.

The prior art system functions without a downstream filtering assembly. However, adding such an assembly drastically reduces some important contaminants, such as, chlorine, iron and sulphur from water.

The Kolm and Aubrey patents cover primarily the removal of metallic ore from a slurry.

DISCLOSURE OF THE INVENTION

The improved magnetic-field amplifier functions with a magnetic amplifying assembly and a magnetic-field receiving structure. The magnetic amplifying assembly operates by generating a pair of magnetic loops that are summed at two ferromagnetic pole members to produce a composite magnetic field that is also referred to as the "Zimmerman effect". The composite magnetic field is applied to the magnetic-field receiving structure that may consist of a fluid conduit, a motor/generator armature or other devices that function by means of a magnetic field.

To treat fluids, an earth or negatively grounded electrically conducive conduit is used. The conduit has attached either an externally lounted or annular line-line magnetic amplifying assembly that maintains the conduit in a negative static condition. Downstream of the magnetic assembly, there may also be installed, in-line with the conduit, a fluid filtering assembly. These two assemblies and the fluid conduit work, in combination to maintain a clean conduit and an improved fluid quality. The system may be designed to operate with water or with petroleum products such as crude oil or oil as used in internal combustion engines. In the engine case, an appropriate oil filter would be employed, in lieu of a water filter to provide further cleansing. When crude oil is being treated the use of an annular in-line magnetic amplifier assembly is preferred.

As stated in the BACKGROUND ART section, water in a natural stream carries a positive static charge which helps to maintain a clear and clean stream. Conversely, the hard water that normally flows in a commercial, industrial or domestic water fluid conduit is at a negative potential which causes the conduit to form the hard scale that causes conduit damage and is detrimental to having clear water.

The magnetic amplifying assembly when used to treat water, is designed to restore and maintain a positive static charge, on the fluid, with respect to the fluid conduit. This is made possible, by the utilization of a portion of Farraday's Law which states, in part, that a flowing conducting fluid that cuts magnetic lines of force will generate an electrical current, in the fluid, perpendicular to the direction of flow. This magnetic field is provided by the magnetic amplifying assembly which produces a first and a second magnetic loop. The two loops are summed and focused at two ferromagnetic pole members that interface with the surface of the fluid conduit. The summed loops produce a composite magnetic field having a concentrated flux density that is in excess of 14,000 gauss. This field is strong enough to perpendicularly penetrate the wall of the fluid conduit in a radial flux density pattern directly into the water flow path causing the electrical current that, in turn, maintains the water at a positive static charge with respect to the conduits negative static charge.

The hard water flowing through the fluid conduit is an excellent conductor due to its mixture of water molecules and suspended and dissolved mineral molecules. The dominant mineral in hard water is calcium carbonate which is dissolved from the limestone in the ground. This mineral, which is attracted to most non-treated water conduits, form rhombic crystals that interlock to form the hard scale that causes water conduit damage. Corrosion, caused by the oxidation of the conduit as well as iron, algae and other cathodic molds, is also present in the water and the fluid conduit.

The water molecule is di-polar, it has two hydrogen atoms that have positive charges and one oxygen atom that has a negative charge. When some of these water molecules cut the magnetic field in the water conduit or they touch the negative charged fluid conduit, one of the hydrogen atoms can separate from the molecule and form hydroxyl ions. This condition allows the hydrogen atoms to attack the crystalline formation in the conduit and reduce the existing scale or corrosion until the conduit is clean, afterwhich, the hydrogen atoms will form a "hydrogen film" to maintain the conduit clean. Additionally, since the water conduit has a negative static charge, the hydroxyl ions and any free oxygen ions cannot touch the conduit since they are also negative and are repelled. Therefore, the conduit will remain free of scale and corrosion. Simply stated, the system redissolves any scale and corrosion and passes it out the conduit as part of the total dissolved solids, leaving a clean conduit, while still producing crystal clear water.

The magnetic amplifying assembly also produces other benefits such as increasing the pH of the water due to the reduction of hydrogen which bonds to the conduit. The available oxygen (aerobic activity) also increases 270 percent; and fewer BTU's are required per degree of temperature increase to heat the water.

The externally mounted magnetic amplifying assembly is comprised of an inner magnetic structure that further consists of three permanent magnets. The first magnet is centrally located and is separated from the second and third magnets by a first and second ferromagnetic pole member respectfully. The three magnets are enclosed at their two sides and upper surfaces by a contiguous ferromagnetic cover. The entire inner magnetic structure is inserted into a cavity located at the bottom of a non-magnetic housing. The housing, on its upper surface, has a strap channel that extends longitudinally. The inner magnetic structure is held within the housing by a non-magnetic housing plate that fits across the housing's cavity. The plate has two slots that are sized to allow the inward ends of the two ferromagnetic pole members to protrude through the respective slots when the plate is attached. The magnetic amplifying assembly is attached to the fluid conduit by having the two ferromagnetic pole members interface with the conduit. A holding strap is then placed over the strap channel and around the conduit. The assembly is oriented so that its south magnetic pole is located upstream from the north magnetic pole. The annular in-line magnetic amplifying assembly is similarly constructed except that the structure is circular and includes a fluid flow tube. The fluid flow tube is attached in-line with the fluid conduit.

The magnetic amplifying assembly may function with or without a filtering assembly. Without a filtering assembly, the magnetic amplifying assembly prevents scaling and corrosion, while at the same time kills cathodic molds and algaes, precipitates suspends solids compresses dissolved solids or dissolves scale and or corrosion if these contaminants already exist, in the fluid conduit. When used in combination with a filtering assembly, the magnetic amplifying assembly still accomplishes the above operations, however, additional unwanted elements present in the water such as chlorine, iron, sulphur, dirt, sediment, and other filterable contaminants are also removed. Thus, the final effluent is further improved.

The fluid filtering assembly consists of a tank having a bed of metal particulates chosen from metals having favorable redox potentials relative to the redox potentials of the undesirable constituents. Embedded within the metal particulate matter is a riser and filter or laterals and filter bed combination. The filter or laterals or filter bed are attached to the bottom end of the riser with the upper end of the riser connected to an output fitting on the filtering assembly. The treated water from the magnetic amplifying assembly enters the filter through an input fitting. The water then circulates through the metal particulate matter and is subsequently applied through the riser and filter combination and out the filters output fitting.

The filtering assembly has little or no effect upon scale or corrosion, but it does remove unwanted elements and compounds. The filtering assembly is vulnerable to scaling, corrosion and amalgamation without the magnetic amplifying assembly which also enhances and increases its electrostatic removal capability. Therefore, while the magnetic amplifying assembly will function without the filtering assembly, the filtering assembly will not function as well or as long without the magnetic amplifying assembly to assist and preserve it.

In view of the above disclosure, it is the primary object of the invention to provide a magnetic-field amplifier that produces a composite magnetic field that may be used to treat fluids flowing in a conduit, or to provide an increased magnetic field to the armature of a motor or generator or other magnetically operated devices.

It is also an object of the invention to have a system that:

is easily monitored, by means of a digital multimeter, to verify that the water flow is at a positive potential with respect to the negative potential on the fluid conduit, is easy to install, contains no moving parts, requires little or no maintenance and is highly reliable and safe, gradually dissolves the scale build-up and corrosion in a conduit and then forms a protective "hydrogen film", which helps protect the clean conduit, reduces iron algae and other cathodic molds and algae that grow in showers, swimming pools, fountains, and removes unwanted elements from the water, and reduces or eliminates the need for chemicals to provide equivalent results.

BEST MODE FOR CARRYING OUT THE INVENTION

The best mode for carrying out the improved magnetic-field amplifier 10 is presented in terms of two embodiments: the first embodiment employs a magnetic amplifying assembly 12 that is mounted external to a magnetic-field receiving structure while the second embodiment employs a circular magnetic amplifying assembly 12 that includes a fluid flow tube that is attached in-line with the magnetic-field receiving structure which in this case is a fluid conduit 60. Both embodiments are designed to treat fluids such as a water supply for domestic or industrial use, crude oil or refined oil as used with an internal combustion engine. A plurality of external units may also be attached circumferentially to supply the magnetic field to operate the armature of a motor or generator. In all cases, the magnetic amplifying assembly produces two magnetic loops that are summed at two ferromagnetic pole members to produce a composite magnetic field that is applied to the magnetic-field receiving structure.

Figure 9:
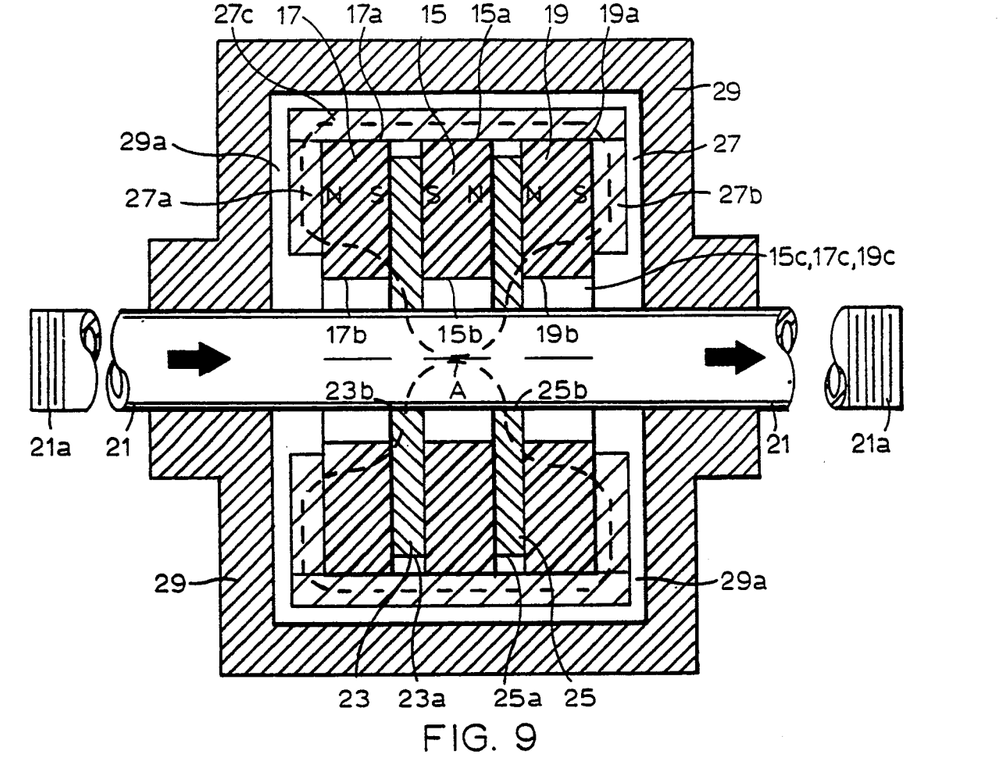
FIG. 9 is a cross-sectional view of the annular in-line magnetic amplifying assembly that also shows the paths of the symmetrical magnetic loops produced by the assembly.
Figure 10:
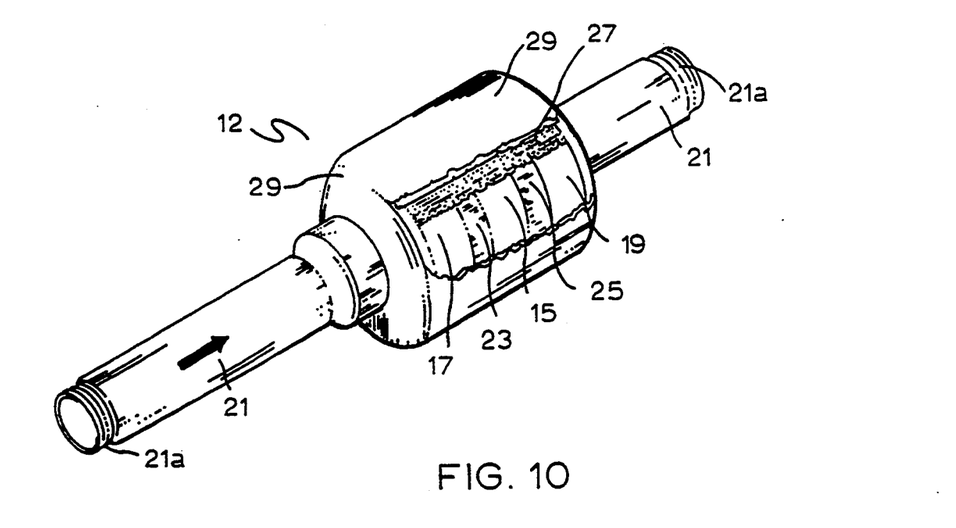
FIG. 10 is a perspective and partial cut-away view of the annular in-line magnetic amplifying assembly.

The initial disclosure covers the externally mounted magnetic amplifying assembly and is described in terms of its application to treat a fluid flowing within a fluid conduit 60. The external assembly is shown in FIGS. 1 through 8. Note, that although an external assembly is shown, the annular in-line assembly as shown in FIGS. 9 and 10 will function equally well.

Figures 1, 2, 3, 8:
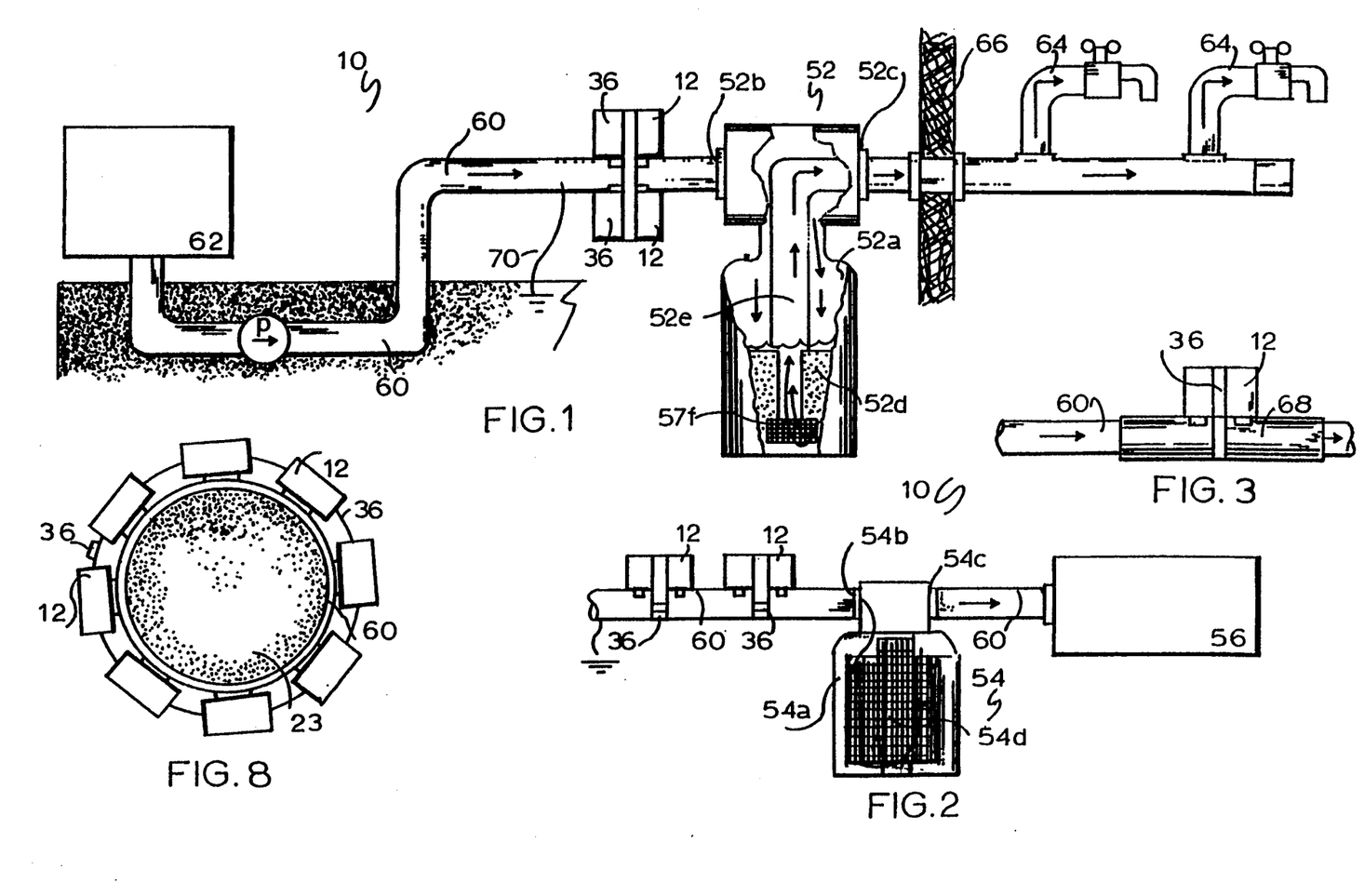
FIG. 1 is a side view and schematic representation of the magnetic-field amplifier as applied to a water distribution circuit.
FIG. 2 is a side view and schematic representation of the magnetic-field amplifier as applied to an oil line as used with an internal combustion engine.
FIG. 3 is a side view of a non-conductive fluid conduit that has had a section removed and replaced with an electrically conductive section.
FIG. 8 is a cross-sectional view of a fluid conduit having a plurality of external magnetic amplifying assemblies strapped around the surface of the fluid conduit in a diametrically opposed pattern.

The improved magnetic-field amplifier 10 is shown in FIG. 1 as would be used in to treat a typical domestic water supply and distribution circuit, while a system 10 as would be used to treat an oil, as used with an internal combustion engine 56, is shown in FIG. 2. As seen in FIG. 1, the fluid conduit 60 is supplied with water originating from a commercial or other water source 62. The water passes through a system consisting of a magnetic amplifying assembly 12 and an optional water filtering assembly 52, and onto a water distribution circuit 64 located within a building 66.

The fluid conduit 60 is made of an electrically conductive material, such as steel, iron or copper. If the commercial conduit is not made of a material that is electrically conductive, a section from the conduit may be removed and replaced with an electrically conductive section 68 as shown in FIG. 3. The system requires that the fluid conduit 60 be at a negative potential to allow the magnetic amplifying assembly 12 to maintain the conduit 60 at a negative static charge. The magnetic amplifying assembly 12 maintains this negative charge by driving electrons from ground, to the conduit and into the fluid flowing in the conduit. In most cases, the conduit itself provides the connection to ground. However, some water pipes are not grounded, in spite of being under the surface. Therefore, in these cases or if an above ground conduit is used, it is necessary to attach a ground wire 70 from the conduit to the earth as also shown in FIG. 1. In all cases, the direction of the fluid flow must be predetermined to allow the magnetic amplifying assembly 12 to be properly installed and assembled with respect to its magnetic polarity.

Figure 4:
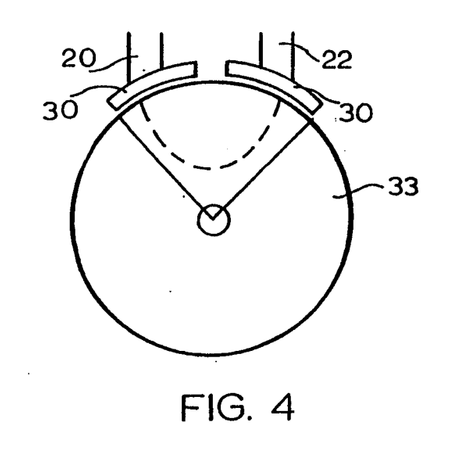
FIG. 4 is a cross-sectional view of a motor or generator having a plurality of magnetic amplifying assemblies attached circumferentially above the armature.

A typical motor or generator application of the magnetic amplifying assembly is shown in FIG. 4. In this application a plurality of the externally mounted magnetic amplifiers are attached circumferentially within and around the housing of the motor or generator, by an attachment means, just above the armature 33. In this design configuration, a curved pole piece 30 is attached to the first and second ferromagnetic pole members 20, 22 to provide an optimum magnetic transfer to the curved armature 33.

The magnetic amplifying assembly 12 is an improved design from that disclosed in the invention's prior U.S. Pat. Nos. 4,265,754 and 4,265,746. The design difference which contributed to the improvement are covered in the BACKGROUND ART section.

Figure 5:
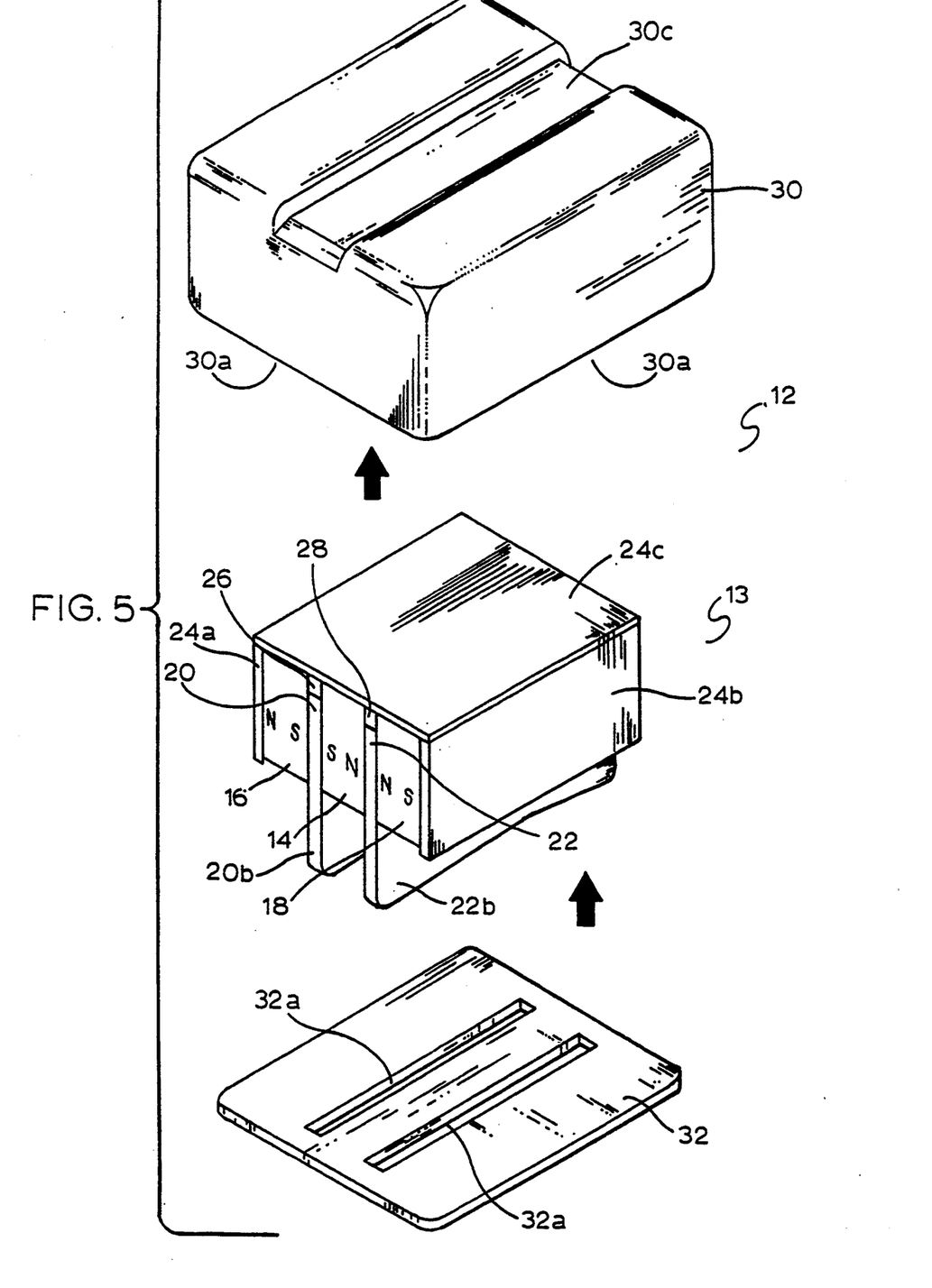
FIG. 5 is an exploded perspective view of the externally mounted magnetic amplifying assembly.
Figure 6:
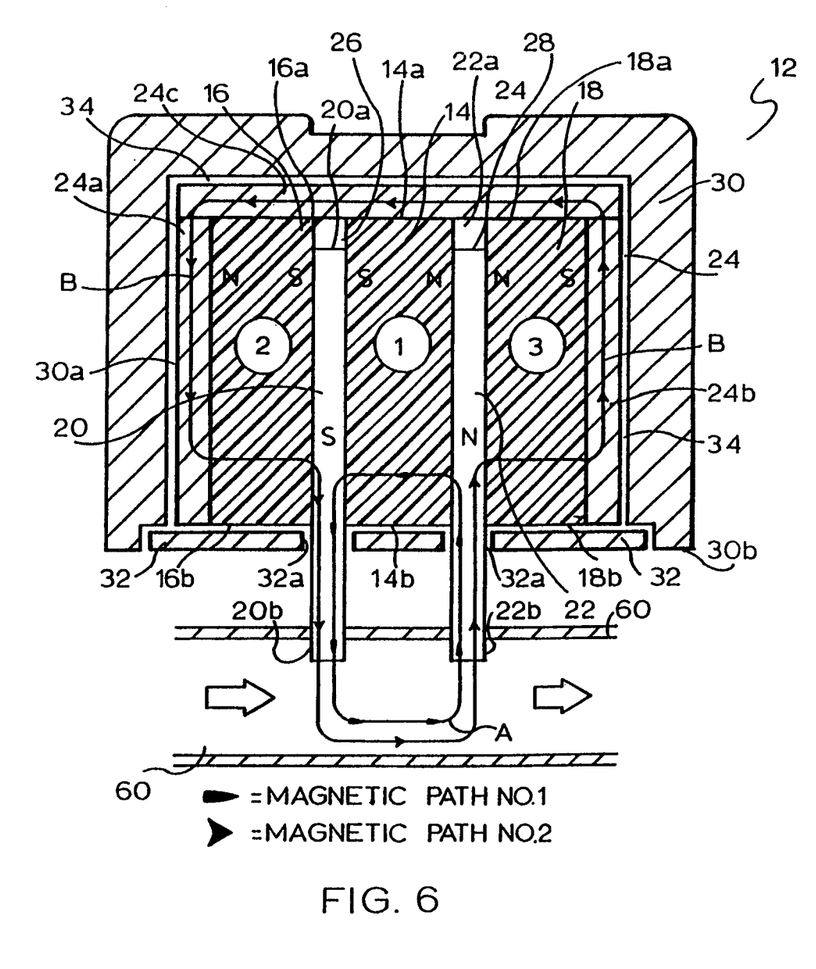
FIG. 6 is a cross-sectional view of the externally mounted magnetic amplifying assembly that also shows the paths of the summed first and second magnetic loops.
Figure 7:
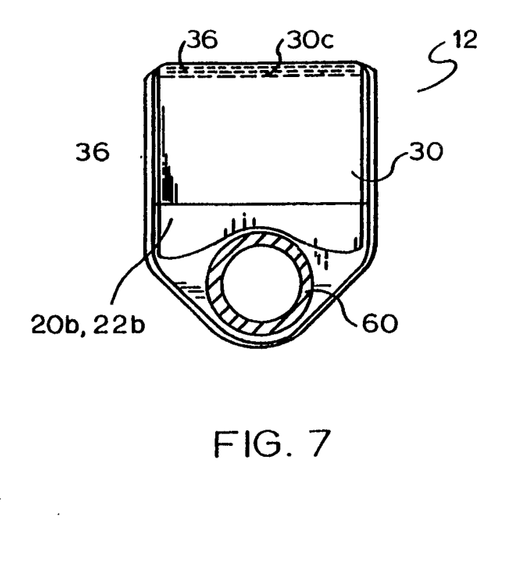
FIG. 7 is a cross-sectional view of the externally mounted magnetic amplifying assembly strapped to a fluid conduit.

The magnetic amplifying assembly, as best shown in FIGS. 5 and 6 is comprised of the following major elements: an inner magnetic structure 13 that is further comprised of a first, second and third permanent magnet 14, 16, 18, a first and second ferromagnetic pole member 20, 22; a ferromagnetic cover 24, and a first and second non-magnetic insulating rod 26, 28. The assembly also includes a non-magnetic housing 30, a non-magnetic housing plate 32 and an adjustable holding strap 36 that fits across a housing strap channel 30c, and across the fluid conduit. When the strap is tightened one or more magnetic amplifying assemblies 16 can be securely held against the surface of the conduit 60.

The three permanent magents 14, 16, 18 are located within the ferromagnetic cover 24. All three magnets are similar and consist of flat permanent magnets having a rectangular cross-section and preferably are ceramic magnets. The first permanent magnet 14 is centrally located within the ferromagnets structure 24. The first magnet has south and north poles that are spaced apart in the direction of the fluid flow through the fluid conduit 60 with its south pole located upstream of the fluid flow.

The second permanent magnet 16 has north and south poles that are also spaced apart in the direction of the fluid flow. The south pole of this magnet faces axially toward the south pole of the centered first permanent magnet 14 and has its north pole located upstream of the fluid flow.

The third permanent magnet 18 has north and south poles that are spaced apart in the direction of the fluid flow through the fluid conduit 60. The north pole of this magnet is located upstream of the fluid flow and faces axially toward the north pole of the first permanent 14.

Between the first and second permanent magnets 14, 16 is located the first ferromagnetic pole member 20 as best shown in FIG. 6. The outward end 20a, of this member is located below the outward ends 14a, 16a of the first and second permanent magnets respectfully; the inward end 20b projects radially inward beyond the inward ends 14b, 16b of the first and second permanent members respectfully.

Between the first and third permanent magnets 14, 18 is located the second ferromagnetic pole member 22 as also shown in FIG. 6. The outward end 22a of this member is located below the outward ends 14a, 18a of the first and third permanent magnets respectfully; the inward end 22b projects radially inward beyond the inward ends 14b, 18b of the first and second permanent magnets respectfully. The inward ends 20b, 22b of both the first and second ferromagnetic pole members have a central angle that provides a solid interface with the fluid conduit 60 as shown best in FIG. 7.

The three permanent magnets and the two ferromagnetic pole members 20, 22 are held together by the ferromagnetic cover 24 to complete the inner magnetic structure 13 as best shown in FIG. 6. This cover consists of a first side 24a, a second side 24b and a third side 24c. The first side 24a fits against and encloses the outward-north pole side of the second permanent magnet 16 and the second side 24b fits against and encloses the outward-south pole side of the third permanent magent 18. The third side 24c has edges that are contiguous with the outward edges of the first and second sides 24a, 24b and has an inward surface that fits against and encloses the outward sides of all three permanent magents 14, 16, 18.

The ferromagnetic cover may be constructed in three individual sides as shown in FIG. 6, or as a single channeled member (not shown). In either case, when the cover is attached, there is a longitudinal space between the outward ends 20a, 22a of the first and second ferromagnetic pole member 20, 22 and the inward side of the third side 24c of the ferromagnetic cover 24. Within these spaces, is longitudinally located a first and a second non-magnetic rod 26, 28 respectfully. These rods isolate the ferromagnetic pole members from the third side 24c of the ferromagnetic cover 24 magnets to prevent a short circuit of a second magnetic loop "B" described infra.

The inner magnetic structure 13 is enclosed by the non-magnetic housing 30. This housing, as best shown in FIGS. 4 and 5, can be made of any non-magnetic material such as plastic or preferably stainless steel for durability. The housing has an opened ended cavity 30a that is sized to slideably accept the inner magnetic structure 13. When inserted, the inward ends 20b, 22b of the first and second ferromagnetic pole members 20, 22 extend beyond the edges 30b of the cavities open end. The housing also has a strap channel 30c that extends longitudinally across the housing's outer surface. The channel is sized to hold the adjustable holding strap 36 that is used to securely hold one or more of the magnetic amplifying assemblies 14 against the surface of the fluid conduit 60. The strap is preferably made of stainless steel and has a means to allow the strap to be easily tightened. The magnetic amplifying assembly 12 may be attached to the fluid conduit in parallel as shown in FIG. 1, in series longitudinally along the conduits surface as shown in FIG. 2, or a plurality of the assemblies may be attached around the circumference surface of the conduit 60 in a diametrically opposed pattern as shown in FIG. 8.

To allow the inner magnetic structure 13 to remain rigidly held within the housing 30, a non-magnetic potting compound 34 is inserted into the housings cavity 30a. The final element required to complete the magnetic amplifying assembly 14 is a non-magnetic housing plate 32. This plate as shown in FIGS. 5 and 6, is sized for attachment along the open-ended edges of the non-magnetic housing 30 by means of the non-magnetic potting compound 34 or some other non-magnetic epoxy. The plate has a set of slots 32a that are located and sized to allow the inward ends 20b, 22b of the first and second ferromagnetic pole members 20, 22 to protrude through the respective slots when the plate 32 is attached.

As shown in FIG. 6, the magnetic amplifying assembly is designed to produce a first magnetic loop "A" identified by the dotted line and a second magnetic loop "B" identified by the dashed line.

The first magnetic loop "A" follows a closed path that for the purposes of explanation, commences at the first ferromagnetic pole member 20, continues in order, through the fluid conduit 60, the second ferromagnetic pole member 22, the north and south poles of the first permanent magnet 14 and completes the closed loop by returning to the first ferromagnetic pole member.

The second magnetic loop "B" follows a closed path that commences at the first ferromagnetic pole member 20, continuous in order, through the fluid conduit 60, the second ferromagnetic pole member 22, the north and south poles of the third permanent magnet 18, the second side 24b, third side 24c and first side 24a of the ferromagnetic cover 24, the north and south poles of the second permanent magnet 16, and completes the closed loop by returning to the first ferromagnetic pole member 20.

The design of the magnetic amplifying assembly 12 allows the two loops "A" and "B" to be summed at their common points location at the first ferromagnetic pole member 20 and the second ferromagnetic pole member 22 as shown in FIG. 6. The summed loops produce a composite magnetic field that has a concentrated flux density that is in excess of 14,000 gauss when ceramic "5" magnets are used. However, a higher reading can be obtained if stronger but more expensive magnets are used. The summed loops are applied perpendicularly through the wall of the fluid conduit in a radial flux density pattern 23, as shown in FIG. 8, into the path of the fluid in the fluid conduit 60. The fluid passing through the magnetic field causes a current to be generated that maintains the fluid flow in the fluid conduit 60 at a positive static charge with respect to the negative static charge of the fluid conduit 60. As best described in the DISCLOSURE OF THE INVENTION section, this combination of electric current and negative fluid conduit, causes some of the water molecules to be ionized by molecular static charges or contact with the fluid conduit. Thus, causing some hydrogen atoms to separate from the water molecules spontaneously or by contact with the negative fluid conduit. The separated hydrogen atoms reduce any scale or corrosion on the fluid conduit, or form a "hydrogen film" on the clean fluid conduit.

The conditioned water produced by the magnetic amplifying assembly 12 is then further improved by placing in-line a fluid filtering assembly 52 that subsequently removes unwanted elements, from the magnetically treated water, such as chlorine, iron, sulphur, dirt and other filterable elements.

The annular in-line magnetic amplifying assembly 12, as shown in FIGS. 9 and 10, is designed to produce the magnetic field required to operate the system 10 and is particularly adaptable to a petroleum line. The annular in-line assembly 12 is comprised of the following major elements: an inner magnetic structure that is further comprised of a first, second and third circular permanent magnet 15, 17, 19, a first and second circular ferromagnetic pole member 23, 25 and a circular ferromagnetic cover 27. The inner structure is designed to be housed in a non-magnetic circular housing 29 that fits into a fluid flow tube 21. The fluid flow tube, as best shown in FIG. 10, has on each end an attachment means which, in the best mode, consists of a threaded section sized to be threaded into a corresponding threaded section on the petroleum fluid conduit 60.

The three circular permanent magnets 15, 17, 19 are located within the circular ferromagnetic cover 27. All three magnets are similar and consist of flat permanent ceramic magnets having a circular cross-section with a centrally located flow-tube bore therethrough.

The first circular permanent magnet is centrally located within the ferromagnets structure 27. This first magnet has south and north poles that are spaced apart in the direction of the fluid flow through the fluid conduit 60 with its south pole located upstream of the fluid flow.

The second circular permanent magnet 17 has north and south poles that are also spaced apart in the direction of the fluid flow. The south pole of this magnet faces axially toward the south pole of the centered first circular permanent magnet 15 and has its north pole located upstream of the fluid flow.

The third circular permanent magnet 19 has north and south poles that are spaced apart in the direction of the fluid flow through the fluid conduit 60. The north pole of this magnet is located upstream of the fluid flow and faces axially toward the north pole of the first permanent magnet 15.

Between the first and second permanent magnets 15, 17 is located the first circular ferromagnetic pole member 23 as shown in FIG. 9 The outward end 23a, of this member is located below the outward ends 15a, 17a of the first and second circular permanent magnets respectfully, the inward end 23b projects radially inward beyond the inward ends 15b, 17b of the first and second circular permanent members respectfully.

Between the first and third permanent magnets 15 19 is located the second ferromagnetic pole member 25 as also shown in FIG. 9. The outward end 25a of this member is located below the outward ends 15a, 19a of the first and third circular permanent magnets respectfully; the inward end 25b projects radially inward beyond the inward ends 15b, 19b of the first and second circular permanent magnets respectfully. The inward ends 23b, 25b of both the first and second circular ferromagnetic pole members 23, 25 have a circumference equal to the circumference of the fluid flow tube 21, thus providing a solid interface with the fluid flow tube 21 as shown best in FIG.

The three circular permanent magnets and the two circular ferromagnetic pole members 23, 25 are held together by the ferromagnetic cover 27 to complete the inner magnetic structure as shown in FIGS. 9 and 10. This cover consists of a first side 27a, a second side 27b and a third side 27c. The first side 27a fits against and encloses the outward north pole side of the second circular permanent magnet 17 and the second side 27b fits against and encloses the outward south pole side of the third circular permanent magnet 19. The third side 27c has edges that are contiguous with the outward edges of the first and second sides 27a, 27b and has an inward surface that fits against and encloses the outward sides of all three permanent magnets 15, 17, 19.

The ferromagnetic cover may be constructed in three individual sides as shown in FIG. 9, or as a single channeled member (not shown). In either case, when the cover is attached, there is a space between the upper ends 23a, 25a of the first and second circular ferromagnetic pole member 23, 25 and the inward side of the third side 27a of the circular ferromagnetic cover 37.

These spaces isolate the circular ferromagnetic pole members from the third side 27c of the circular ferromagnetic cover 27 to prevent a magnetic short circuit.

The inner magnetic structure is enclosed by the non-magnetic circular housing 29. This housing, as shown in FIGS. 9 and 10, can be made of any non-magnetic material such as plastic or preferrably stainless steel for durability. The housing has a circular cavity 29a that is sized to slideably accept the circular inner magnetic structure. To allow the inner magnetic structure to remain rigidly held within the housing 29, a non-magnetic potting compound is inserted into the housing. The housing also has a bore on each end that is sized to allow the housing to slideably fit into and be attached to the fluid flow tube 21 by a welding means.

As shown in FIG. 9, the magnetic amplifying assembly is designed to produce a set of symmetrical magnetic loops identified by the dotted lines. The magnetic loops are summed at an intersection point "A" as also shown in FIG. 9. The summed loops, which produce a concentrated flux density in excess of 14,000 gauss when using ceramic-5 magnets, are applied perpendicularly through the wall of the fluid flow tube 21 into the fluid flow path. The fluid, which in this case is a petroleum fluid, passing through the magnetic field causes a current to be generated that maintains the fluid flow in the fluid flow tube 21 and fluid conduit 60 at a positive static charge with respect to the negative static charge of the fluid conduit 60.

The fluid filtering assembly 50 may be either a water filtering assembly 52, as shown in FIG. 1, or an oil filtering assembly 54 as shown in FIG. 2.

The water filtering assembly 52 is located in-line with the fluid conduit 60 downstream from the magnetic amplifying assembly 12 such that the input into the water filtering assembly is the treated water from the magnetic amplifying assembly 12 and the filter's output is the water that has been treated by both the magnetic amplifying assembly 12 and the water filtering assembly 52.

The water filtering assembly 52 is comprised of a tank 52a having an input fitting 52b that is connected to the output of the magnetic amplifying assembly 12, via the fluid conduit 60, and an output fitting 52c that is connected to a plurality of water taps 64 located within a building 66.

Within the tank 52a is located a bed of metal particulate matter 52d that is chosen from metals having favorable redox potentials relative to the redox potentials of the undesirable constituents to be filtered, such as chlorine, iron, sulphur and the like. The assembly 52, in conjunction with the magnetic assembly 12, establishes conditions for the electrostatic capturing of unwanted elements as well as the spontaneous oxidation and reduction reactions between the undesirable constituents and the metal particulates. The metal particulate matter 52d may consist of copper metal particles, a metal alloy of copper and zinc or other metallic combinations. The metal particulate matter can also be of varying mesh size, preferably from 4 to 30 mesh based on U.S. Standard screen sizes and of any desired shape.

The matter 52 is typically arranged in a loose bed confined within the tank 52a by means which prevents the escape of the particulate matter but which, at the same time, permits water flow therethrough. The selection and further detailed data as the metal particulate matter 52d is disclosed in U.S. Pat. No. 4,642,192 issued to HESKETT on 10 Feb. 1987 and entitled: "METHOD OF TREATING FLUIDS". This patent is hereby incorporated by reference.

Within the tank 52a is centrally located a riser 52e and filter 52f or laterals and filter bed combination. The filter, as shown in FIG. 1, is attached to the bottom end of the riser and the upper end of the riser is connected to the output fitting 52c of the tank 52a. The riser 52e and filter 52f combination is located within the tank imbedded into and surrounded by the metal particulate matter 52d. The magnetically treated water enters the tank 52a for further treating, through the input fitting 52b. The water then circulates through the metal particulate matter 52d and is subsequently applied through the riser and filter combination and out the tanks output fitting 52c.

The oil filtering assembly 54, as shown in FIG. 2, is also located in-line with the fluid conduit 60 downstream from the magnetic amplifying assembly 12. The assembly 54 consists of a tank 54a that has an input fitting 54b that is connected to the output of the magnetic amplifying assembly 12, via the fluid conduit 60, and an output fitting 54c that is connected to the internal combustion engine 56. Within the tank 54a is located an oil filtering means 54. This means may be of any type such as multiple baffles or a roll of toilet paper as used on Franz filters manufactured by Skye Industries located in Stockton, Calif.

In all cases, the oil to be treated enters the tank 54a through the input fitting 54b, circulates through the filtering means 54d and subsequently is applied through the output fitting 54c to the internal combustion engine 56.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

We claim:

1. A magnetic-field amplifier comprising:

A. a magnetic-field receiving structure, and

B. a magnetic amplifying assembly that generates a plurality of magnetic loops that are summed to produce a composite magnetic field, where said assembly is attached to said structure by an attachment means to allow said structure to receive the magnetic field, wherein said magnetic amplifying assembly comprises:

a) an inner magnetic structure further comprising:

(1) a first permanent magnet having a south pole, a north pole, an outward end, and an inward end, (2) a second permanent magnet having a north pole, a south pole, an outward end, and an inward end, where the south pole of said second permanent magnet faces the south pole of said first permanent magnet, (3) a third permanent magnet having a south pole, a north pole, an outward end, and an inward end, where the north pole of said third permanent magnet faces the north pole of said first permanent magnet, (4) a first ferromagnetic pole member located between said first and second permanent magnets that includes an outward end and an inward end and forms a south pole summing point, where the outward end of said first ferromagnetic pole member is located inwardly relative to the outward ends of said first and second permanent magnets to create a space therebetween, and the inward end of said first ferromagnetic pole member projects radially inward beyond the inward ends of said first and second permanent magnets to interface with the magnetic-field receiving structure, (5) a second ferromagnetic pole member located between said first and third permanent magnets that includes an outward and an inward end, and forms a north pole summing point, where the outward end of said second ferromagnetic pole member is located inwardly relative to the outward ends of said first and third permanent magnets to create a space therebetween, and the inward end of said second ferromagnetic pole member projects radially inward beyond the inward ends of said first and third permanent magnets to interface with the magnetic-field receiving structure, (6) a ferromagnetic cover comprising:

(a) a first side that fits against and encloses the outward-north pole side of said second permanent magnet, (b) a second side that fits against and encloses the outward-south pole side of said third permanent magnet, (c) a third side having an inward surface and edges that are contiguous with the outward edges of said first and second sides and where the inward surface of said third side fits against and encloses the outward sides of said first, second and third permanent magnets, to enclose the space created between the outward end of said first ferromagnetic pole member and the outward ends of said first and second permanent magnets, and the space created between the outward end of said second ferromagnetic pole member and the outward ends of said first and third permanent magnets, where into each said space is longitudinally and respectively located a first non-magnetic insulating rod and a second non-magnetic insulating rod, b) a non-magnetic housing having a strap channel on its outward side and an open-ended cavity sized to accept said inner magnetic structure with the inward ends of said first and second ferromagnetic pole members extending beyond the edges of the cavities open end and, c) a non-magnetic housing plate sized for attachment along the open-ended edges of said non-magnetic housing, with said plate having a set of slots that are located and sized to allow the inward ends of said first and second ferromagnetic pole members to protrude through the respective slots when said plate is attached.

2. A magnetic-field amplifier comprising:

A. a magnetic-field receiving structure, and

B. a magnetic amplifying assembly that generates a plurality of magnetic loops that are summed to produce a composite magnetic field, where said assembly is attached to said structure by an attachment means to allow said structure to receive the magnetic field, wherein said magnetic amplifying assembly comprises:

a) an inner magnetic structure further comprising:

(1) a first permanent magnet having a south pole, a north pole, an outward end, and an inward end, (2) a second permanent magnet having a north pole, a south pole, an outward end, and an inward end, where the south pole of said second permanent magnet faces the south pole of said first permanent magnet, (3) a third permanent magnet having a south pole, a north pole, an outward end, and an inward end, where the north pole of said third permanent magnet faces the north pole of said first permanent magnet, (4) a first ferromagnetic pole member located between said first and second permanent magnets that includes an outward end and an inward end and forms a south pole summing point, where the outward end of said first ferromagnetic pole member is located inwardly relative to the outward ends of said first and second permanent magnets to create a space therebetween, and the inward end of said first ferromagnetic pole member projects radially inward beyond the inward ends of said first and second permanent magnets to interface with the magnetic-field receiving structure, (5) a second ferromagnetic pole member located between said first and third permanent magnets that includes an outward and an inward end, and forms a north pole summing point, where the outward end of said second ferromagnetic pole member is located inwardly relative to the outward ends of said first and third permanent magnets to create a space therebetween, and the inward end of said second ferromagnetic pole member projects radially inward beyond the inward ends of said first and third permanent magnets to interface with the magnetic-field receiving structure, (6) a ferromagnetic cover comprising:

(a) a first side that fits against and encloses the outward-north pole side of said second permanent magnet, (b) a second side that fits against and encloses the outward-south pole side of said third permanent magnet, (c) a third side having an inward surface and edges that are contiguous with the outward edges of said first and second sides and where the inward surface of said third side fits against and encloses the outward sides of said first, second and third permanent magnets, to enclose the space created between the outward end of said first ferromagnetic pole member and the outward ends of said first and second permanent magnets, and the space created between the outward end of said second ferromagnetic pole member and the outward ends of said first and third permanent magnets, where into each said space is longitudinally and respectively located a first non-magnetic insulating rod and a second non-magnetic insulating rod, b) a non-magnetic housing having a strap channel on its outward side and an open-ended cavity sized to accept said inner magnetic structure with the inward ends of said first and second ferromagnetic pole members extending beyond the edges of the cavities open end, c) a non-magnetic housing plate sized for attachment along the open-ended edges of said non-magnetic housing, with said plate having a set of slots that are located and sized to allow the inward ends of said first and second ferromagnetic pole members to protrude through the respective slots when said plate is attached, and d) a non-magnetic potting compound that is inserted into said housing to cause said inner magnetic structure to remain rigidly held within said housing.

3. A magnetic-field amplifier comprising:

A. a magnetic-field receiving structure, and

B. a magnetic amplifying assembly that generates a plurality of magnetic loops that are summed to produce a composite magnetic field, where said assembly is attached to said structure by an attachment means to allow said structure to receive the magnetic field, wherein said magnetic amplifying assembly comprises:

a) an inner magnetic structure further comprising:
   (1) a first permanent magnet having a south pole, a north pole, an outward end, and an inward end,
   (2) a second permanent magnet having a north pole, a south pole, an outward end, and an inward end, where the south pole of said second permanent magnet faces the south pole of said first permanent magnet,
   (3) a third permanent magnet having a south pole, a north pole, an outward end, and an inward end, where the north pole of said third permanent magnet faces the north pole of said first permanent magnet,
   (4) a first ferromagnetic pole member located between said first and second permanent magnets that includes an outward end and an inward end and forms a south pole summing point, where the outward end of said first ferromagnetic pole member is located inwardly relative to the outward ends of said first and second permanent magnets to create a space therebetween, and the inward end of said first ferromagnetic pole member projects radially inward beyond the inward ends of said first and second permanent magnets to interface with the magnetic-field receiving structure,
   (5) a second ferromagnetic pole member located between said first and third permanent magnets that includes an outward and an inward end, and forms a north pole summing point, where the outward end of said second ferromagnetic pole member is located inwardly relative to the outward ends of said first and third permanent magnets to create a space therebetween, and the inward end of said second ferromagnetic pole member projects radially inward beyond the inward ends of said first and third permanent magnets to interface with the magnetic-field receiving structure,
   (6) a ferromagnetic cover comprising:
      (a) a first side that fits against and encloses the outward-north pole side of said second permanent magnet,
      (b) a second side that fits against and encloses the outward-south pole side of said third permanent magnet,
      (c) a third side having an inward surface and edges that are contiguous with the outward edges of said first and second sides and where the inward surface of said third side fits against and encloses the outward sides of said first, second and third permanent magnets, to enclose the space created between the outward end of said first ferromagnetic pole member and the outward ends of said first and second permanent magnets, and the space created between the outward end of said second ferromagnetic pole member and the outward ends of said first and third permanent magnets, where into each said space is longitudinally and respectively located a first non-magnetic insulating rod and a second non-magnetic insulating rod,
b) a non-magnetic housing having a strap channel on its outward side and an open-ended cavity sized to accept said inner magnetic structure with the inward ends of said first and second ferromagnetic pole members extending beyond the edges of the cavities open end,
c) a non-magnetic housing plate sized for attachment along the open-ended edges of said non-magnetic housing, with said plate having a set of slots that are located and sized to allow the inward ends of said first and second ferromagnetic pole members to protrude through the respective slots when said plate is attached, and
d) an adjustable holding strap that fits across said strap channel located on said non-magnetic housing and the outer perimeter of the fluid conduit, where when said strap is tightened said magnetic amplifying assembly is securely held against the surface of the fluid conduit.

4. A magnetic-field amplifier comprising:
A. a magnetic-field receiving conduit for carrying a fluid, and
B. a magnetic amplifying assembly that generates a plurality of magnetic loops that are summed to produce a composite magnetic field, where said assembly is attached to said structure by an attachment means to allow said structure to receive the magnetic field, wherein said magnetic amplifying assembly comprises:
   a) an inner magnetic structure further comprising:
      (1) a first permanent magnet having a south pole, a north pole, an outward end, and an inward end,
      (2) a second permanent magnet having a north pole, a south pole, an outward end, and an inward end, where the south pole of said second permanent magnet faces the south pole of said first permanent magnet,
      (3) a third permanent magnet having a south pole, a north pole, an outward end, and an inward end, where the north pole of said third permanent magnet faces the north pole of said first permanent magnet,
      (4) a first ferromagnetic pole member located between said first and second permanent magnets that includes an outward end and an inward end and forms a south pole summing point, where the outward end of said first ferromagnetic pole member is located inwardly relative to the outward ends of said first and second permanent magnets to create a space therebetween, and the inward end of said first ferromagnetic pole member projects radially inward beyond the inward ends of said first and second permanent magnets to interface with the magnetic-field receiving structure,
      (5) a second ferromagnetic pole member located between said first and third permanent magnets that includes an outward and an inward end, and forms a north pole summing point, where the outward end of said second ferromagnetic pole member is located inwardly relative to the outward ends of said first and third permanent magnets to create a space therebetween, and the inward end of said second ferromagnetic pole member projects radially inward beyond the inward ends of said first and third permanent magnets to interface with the magnetic-field receiving structure,
      (6) a ferromagnetic cover comprising:

(a) a first side that fits against and encloses the outward-north pole side of said second permanent magnet, (b) a second side that fits against and encloses the outward-south pole side of said third permanent magnet, (c) a third side having an inward surface and edges that are contiguous with the outward edges of said first and second sides and where the inward surface of said third side fits against and encloses the outward sides of said first, second and third permanent magnets, to enclose the space created between the outward end of said first ferromagnetic pole member and the outward ends of said first and second permanent magnets, and the space created between the outward end of said second ferromagnetic pole member and the outward ends of said first and third permanent magnets, where into each said space is longitudinally and respectively located a first non-magnetic insulating rod and a second non-magnetic insulating rod, b) a non-magnetic housing having a strap channel on its outward side and an open-ended cavity sized to accept said inner magnetic structure with the inward ends of said first and second ferromagnetic pole members extending beyond the edges of the cavities open end, c) a non-magnetic housing plate sized for attachment along the open-ended edges of said non-magnetic housing, with said plate having a set of slots that are located and sized to allow the inward ends of said first and second ferromagnetic pole members to protrude through the respective slots when said plate is attached, wherein said magnetic amplifying assembly produces a first magnetic loop that is summed with a second magnetic loop at said first and second ferromagnetic pole members from where the summed magnetic loops produce a composite magnetic field that is applied perpendicularly through a wall of the fluid conduit in a radial flux density pattern into the path of the fluid flow where:

(1) the first magnetic loop follows a closed path that commences at said first ferromagnetic pole member continues, in order, through the fluid conduit, said second ferromagnetic pole member, the north and south poles of said first permanent magnet and completes the closed loop by returning to said first ferromagnetic pole member, and (2) the second magnetic loop follows a path that commences at said first ferromagnetic pole member, continues, in order, through the fluid conduit, said second ferromagnetic pole member, the north and south poles of said third permanent magnet, the second, third and first sides of said ferromagnetic cover, the north and south poles of said second permanent magnet and completes the closed loop by returning to said first ferromagnetic pole member.

5. A magnetic-field amplifier comprising:

A. a magnetic-field receiving conduit for carrying a fluid, and

B. a magnetic amplifying assembly that generates a plurality of magnetic loops that are summed to produce a composite magnetic field, where said assembly is attached to said structure by an attachment means to allow said structure to receive the magnetic field, wherein said magnetic amplifying assembly comprises:

a) an inner magnetic structure further comprising:

(1) a first permanent magnet having a south pole, a north pole, an outward end, and an inward end, (2) a second permanent magnet having a north pole, a south pole, an outward end, and an inward end, where the south pole of said second permanent magnet faces the south pole of said first permanent magnet, (3) a third permanent magnet having a south pole, a north pole, an outward end, and an inward end, where the north pole of said third permanent magnet faces the north pole of said first permanent magnet, (4) a first ferromagnetic pole member located between said first and second permanent magnets that includes an outward end and an inward end and forms a south pole summing point, where the outward end of said first ferromagnetic pole member is located inwardly relative to the outward ends of said first and second permanent magnets to create a space therebetween, and the inward end of said first ferromagnetic pole member projects radially inward beyond the inward ends of said first and second permanent magnets to interface with the magnetic-field receiving structure, (5) a second ferromagnetic pole member located between said first and third permanent magnets that includes an outward and an inward end, and forms a north pole summing point, where the outward end of said second ferromagnetic pole member is located inwardly relative to the outward ends of said first and third permanent magnets to create a space therebetween, and the inward end of said second ferromagnetic pole member projects radially inward beyond the inward ends of said first and third permanent magnets to interface with the magnetic-field receiving structure, (6) a ferromagnetic cover comprising:

(a) a first side that fits against and encloses the outward-north pole side of said second permanent magnet, (b) a second side that fits against and encloses the outward-south pole side of said third permanent magnet, (c) a third side having an inward surface and edges that are contiguous with the outward edges of said first and second sides and where the inward surface of said third side fits against and encloses the outward sides of said first, second and third permanent magnets, to enclose the space created between the outward end of said first ferromagnetic pole member and the outward ends of said first and second permanent magnets, and the space created between the outward end of said second ferromagnetic pole member and the outward ends of said first and third permanent magnets, where into each said space is longitudinally and respectively located a first non-magnetic insulating rod and a second non-magnetic insulating rod, b) a non-magnetic housing having a strap channel on its outward side and an open-ended cavity sized to accept said inner magnetic structure with the inward ends of said first and second ferromagnetic pole members extending beyond the edges of the cavities open end, c) a non-magnetic housing plate sized for attachment along the open-ended edges of said non-magnetic housing, with said plate having a set of slots that are located and sized to allow the inward ends of said first and second ferromagnetic pole members to protrude through the respective slots when said plate is attached, wherein said magnetic amplifying assembly produces a first magnetic loop that is summed with a second magnetic loop at said first and second ferromagnetic pole members from where the summed magnetic loops produce a composite magnetic field that is applied perpendicularly through a wall of the fluid conduit in a radial flux density pattern into the path of the fluid flow where:

(1) the first magnetic loop follows a closed path that commences at said first ferromagnetic pole member continues, in order, through the fluid conduit, said second ferromagnetic pole member, the north and south poles of said first permanent magnet and completes the closed loop by returning to said first ferromagnetic pole member, and (2) the second magnetic loop follows a path that commences at said first ferromagnetic pole member, continues, in order, through the fluid conduit, said second ferromagnetic pole member, the north and south poles of said third permanent magnet, the second, third and first sides of said ferromagnetic cover, the north and south poles of said second permanent magnet and completes the closed loop by returning to said first ferromagnetic pole member wherein the summed magnetic loops generated by said magnetic amplifying assembly produce a concentrated flux density in excess of 14,000 gauss.

* * * * *